FIG. I

INVENTOR.
JAMES LEE MASSEY

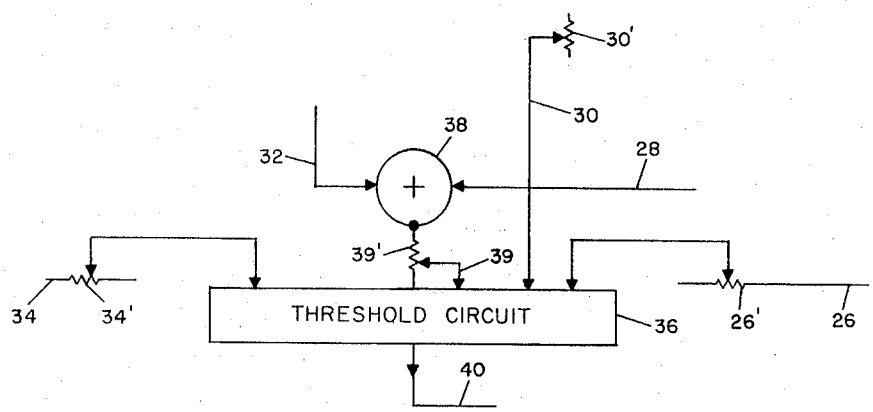
FIG. 2
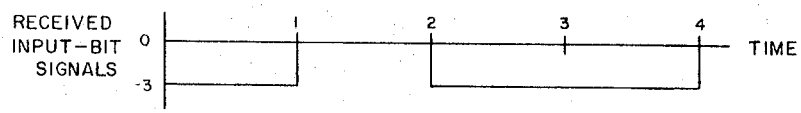
FIG. 3A
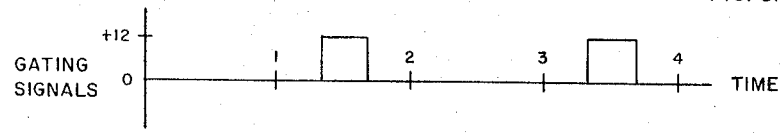
FIG. 3B
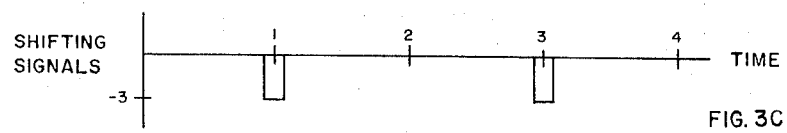
FIG. 3C
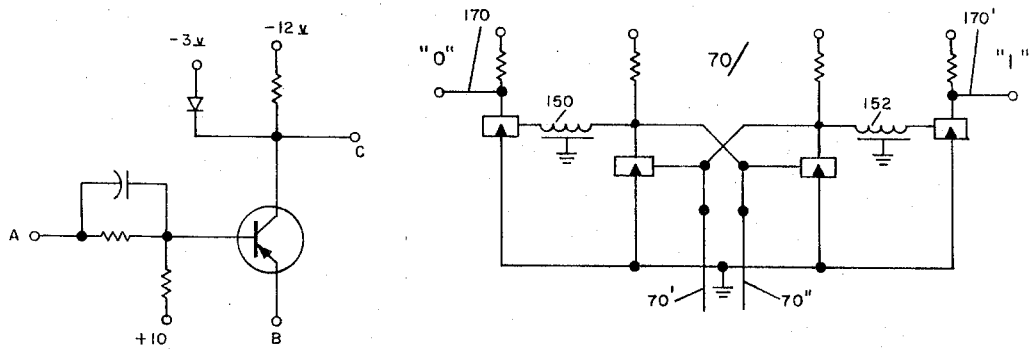
FIG. 3D
FIG. 5

INVENTOR.
JAMES LEE MASSEY
Rines and Rines
ATTORNEYS

Feb. 7, 1967  J. L. MASSEY  3,303,333
ERROR DETECTION AND CORRECTION SYSTEM FOR CONVOLUTIONAL CODES
Filed July 25, 1962  5 Sheets-Sheet 5

INVENTOR.
JAMES LEE MASSEY

Rines and Rines
ATTORNEYS

United States Patent Office 3,303,333
Patented Feb. 7, 1967

3,303,333
ERROR DETECTION AND CORRECTION SYSTEM FOR CONVOLUTIONAL CODES
James Lee Massey, Watertown, Mass., assignor to Codex Corporation, Cambridge, Mass., a corporation of Delaware
Filed July 25, 1962, Ser. No. 212,312
23 Claims. (Cl. 235—153)

The present invention relates to methods of and apparatus for processing signal information, and, more particularly, to the correcting and/or detecting of signal errors or other changes, as produced in transmission.

In signal-transmission systems involving the encoding of a signal information, as in binary bits representing "0" or "1" symbols, noise and similar factors, at play during the signal transmission process, may change the signal erroneously to cause the reception of a "1" or a "0" when the actual transmitted signals were "0" or "1" bits, respectively. It is to the solution of the problem of detecting such errors and preferably correcting the same that the present invention is primarily directed; it being an object of the invention to provide a new and improved method of and apparatus for such signal processing.

A further object is to provide a new and improved apparatus for detecting (and correcting, in important instances) errors caused by noise and similar factors in successive transmitted information signals.

Another object is to provide a novel decoding apparatus of more general utility, as well.

Still another object is to provide a novel method of and apparatus for majority decoding of coded signals, with particular, though not exclusive, emphasis upon convolutional codes.

An addtional object is to provide an improved majority decoding apparatus or the like with a novel weighting system.

A further object, still, is to provide a new and improved decoding apparatus embodying a threshold-operated decoder for group codes.

Other and further objects will be explained hereinafter and will be more particularly pointed out in connection with the appended claims.

In summary, from one of its important aspects, the invention contemplates receiving successive transmitted information signals with redundancy signals interposed therebetween and separating the received information signals and the received interposed redundancy signals. Different groups of error signals associated with different received information signals and interposed redundancy signals are then detected, and response is made to the presence of a predetermined number of such groups of error signals, preferably with subsequent correction of any detected erroneous change in an information signal. Preferred constructional details are hereinafter set forth.

The invention will now be described in connection with the accompanying drawing, FIG. 1 of which is a block diagram of a preferred apparatus for practicing the method underlying the invention;

FIG. 2 is a partial block digram of a weighting modification for the system of FIG. 1;

FIGS. 3A, 3B and 3C are wave-form or timing diagrams illustrating the relative sequence of operation of the input, gating and signal-shifting circuits of FIG. 3;

FIGS. 3D and 5 are circuit diagrams of preferred forms of inverter and delay flip-flop circuits for use in the system of FIG. 3;

Figure 1:
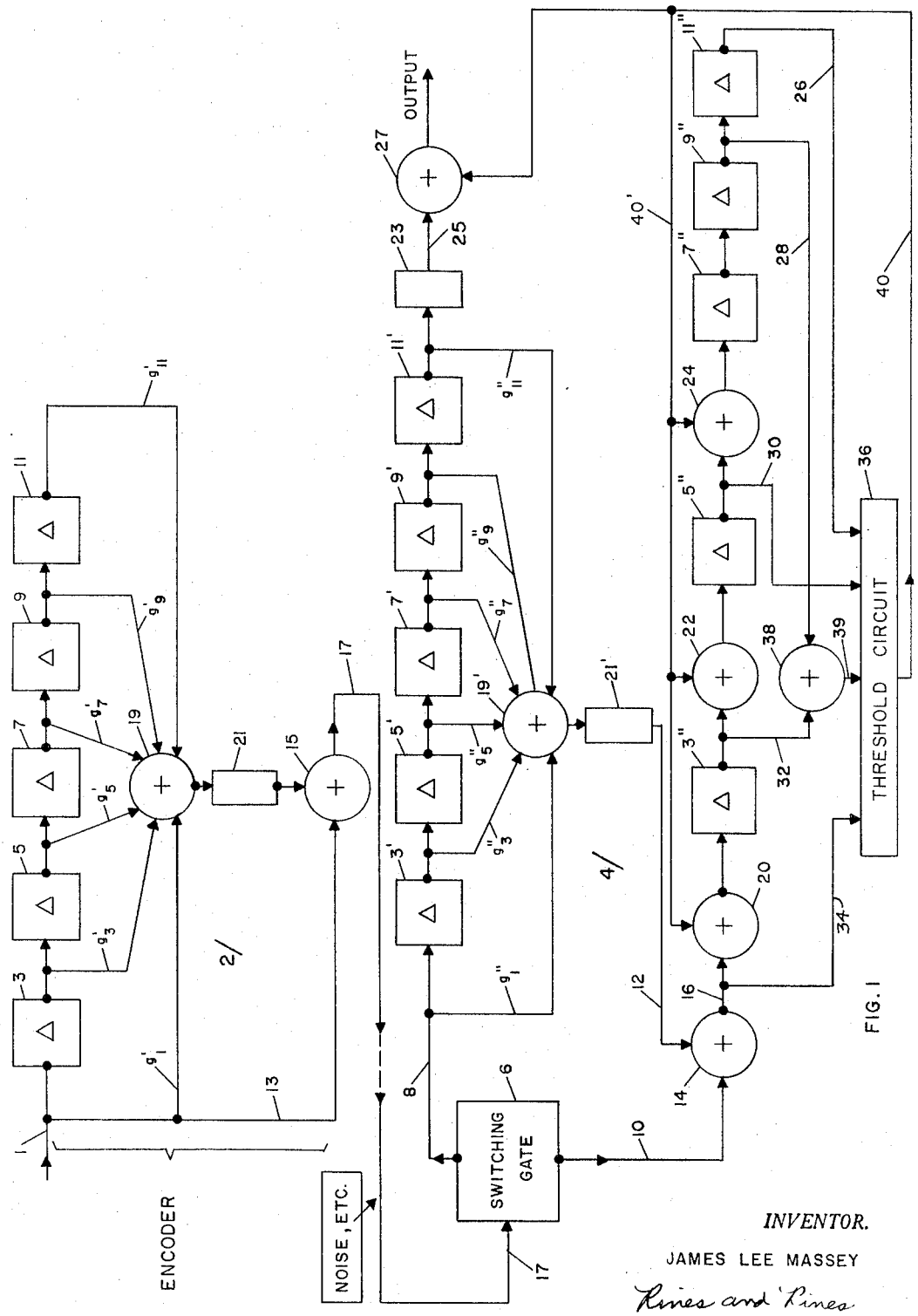

At the input conductor 1 of the encoder portion 2 of the apparatus of FIG. 1, successive signals representing symbols of information or data are applied, say one unit every two intervals of a predetermined reference clock period or frequency, $i_0$, $i_2$, $i_4$, $i_6$, $i_8$, $i_{10}$, etc. If this information were transmitted without encoding, some of the information symbols might become changed, as by noise or other factors in the system, and there would be no way of detecting or correcting those changes or errors. The encoder 2 is employed to supply redundancy to the information sequence; that is, to insert or interpose between the successive information signals, additional signal symbols which are linear functions of the information and which enable the detection and/or correction of such errors, as later explained.

Let it be assumed, for purposes of illustration, that the information symbols are binary signal digits or bits; i.e., a "1" or a "0" bit. This may be encoded in a conventional convolution code, as suggested by P. Elias in an article entitled, "Coding for Noisy Channels," Institute of Radio Engineers Convention Record, part IV, 1955, pp. 37–44, or in other codes, also. For purposes of an example only the invention is explained as applied to a systematic code having a rate ½ (every other signal a redundancy) and a constraint length of 12 (6 information signals within the encoder at any one time and a redundancy signal being generated each time the information signals are shifted one position).

In FIG. 1, the encoder 2 comprises a chain of five serially connected stages of shift register or time-delay 3, 5, 7, 9 and 11, such as tapped delay lines or serially connected multivibrators, later described. The time delay introduced by each stage may be equivalent to two units of the clock or reference period represented by the symbol $D^2$ (meaning "Delay—2 time units"), so that an input bit of information, such as that at the initial time $i_0$, will successively propagate every two units of reference period from stage 3, to stage 5, to stage 7, and so on. At even instants of time, the symbols $i_0$, $i_2$, $i_4$, $i_6$, etc., are fed along conductor 13 to an adder or gate circuit 15 for passing the same to the encoder output 17.

Redundancy signals are computed by a further adder 19 into which signals are fed directly from the input conductor 1 by way of conductor $g_1'$; from the output of stage 7 (representing a 6-unit delay) by way of conductor $g_7'$; from the output of stage 9 (representing an 8-unit delay) by conductor $g_9'$; and from the output of stage 11 (representing a 10-unit delay), by means of conductor $g_{11}'$. Conductors $g_3'$ and $g_5'$ (from the respective stages 3 and 5) may also be provided.

Thus, with an input comprising successive bits introduced two units of time apart, the input signal may be represented by the expression $$I = i_0 + i_2 D^2 + i_4 D^4 + i_6 D^6 + \ldots i_{10} D^{10} \qquad (1)$$

meaning, bit $i_2$ is delayed two units; bit $i_4$, four units; and so on. The encoder code or generator sequence may be of many different types, but the preferred convolutional code $g$ is as follows:

$$g = 1 + g_1 D^1 + g_3 D^3 + \ldots g_{11} D^{11} \qquad (2)$$

meaning, that if $i_0$ is "1," and all other information signal symbols are "0," the encoder output will be unity at the initial time, and will have value $g_1$ after one unit of time; $g_3$ after three units of time; and so on. For a more general sequence, the encoder output $t$ will be the product of the input (Equation (1)) and the generator or code sequence (Equation (2)), namely, $$t = (I)(g) \tag{3}$$

In this mathematical treatment, it is to be understood that the operations of multiplication and addition are carried out as in binary-number logic, such that $1 \times 1 = 1$, $1 \times 0 = 0$, $0 \times 1 = 0$ and $0 \times 0 = 0$; and $1+1=0$, $0+0=0$ and $1+0$ or $0+1=1$ (so-called "modulo-two" arithmetic).

Equation 3 is the operation performed by the encoder 2 by means of the above-described apparatus. The conductor $g_1'$ is used to feed adder 19 with the original input bits, assuming the code value $g_1 = 1$. Similarly, conductors $g_7'$, $g_9'$ and $g_{11}'$ feed the respective delayed outputs from stages 7, 9 and 11 to the adder 19 if the code values $g_7$, $g_9$ and $g_{11} = 1$. No output is fed along conductors $g_3'$ and $g_5'$ (which may be viewed as open circuits) if the code values $g_3$ and $g_5$ are each zero. By connecting a further delay unit 21 between the output of adder 19 and an input to the gate 15, which introduces a delay of only a single unit of time, supplemental or redundancy signals will be provided at the odd intervals of time between $i_0$ and $i_2$, $i_2$ and $i_4$, $i_4$ and $i_6$, $i_6$ and $i_8$, $i_8$ and $i_{10}$, and $i_{10}$ and $i_{12}$. If, therefore, $i_0 = 1$ and all other signal-information bits are zero, the output of the single-unit delay stage 21 will be a "1" signal at times $D^1$, $D^7$, $D^9$ and $D^{11}$. The output of the encoder from gate 15, for this case would be $t = 1 + D^1 + D^7 + D^9 + ^{11}$; or, in digital notation,
$= 1,1,0,0,0,0,0,1,0,1,0,1.$ (4)

Thus a "1" at time zero, causes four redundant "1" signals which, as will later be more evident, may be used to detect and/or correct the before-mentioned errors or changes in the transmitted sequence.

These encoded signals are shown transmitted in any desired manner to a receiving-and-decoding apparatus 4, schematically shown as transmitted along the path 17, with "noise" or other interfering factors effecting possible changes in the transmitted sequence. At the even time-unit intervals corresponding to the original input signal-information bits $i_0$, $i_2$, $i_4$, etc., there will be received, at the receiver decoder 4, corresponding signals $i_{0_r}$, $i_{2_r}$, $i_{4_r}$, etc., some of which may be spuriously changed from "1" to "0," or vice versa, by the effects of noise or other influences. These error effects may be indicated by symbols $e_0$, $e_2$, $e_4$, etc., representing noise-signal influences referred to herein as "error components" which may be unity in the case of causing a change in the transmitted bit, or zero if no change has occurred. At the odd time units the redundancy signals $p_{1_r}$, $p_{3_r}$, $p_{5_r}$, etc., are received, affected by noise components $e_1$, $e_3$, $e_5$, etc. The total received signal $T_r$ may then be represented by $$T_r = t + E \tag{5}$$

where $t$ is the sequence of message components and $E$ is the corresponding sequence of error components $e_0$, $e_1$, $e_2$, etc., and where the indicated addition is binary "module-two" addition logic, as before explained; such as, $1+1=0$, $1+0$ or $0+1=1$, and $0+0=0$.

The first function of the decoder 4 is to separate the received even-time information symbols $i_{0_r}$, $i_{2_r}$, $i_{4_r}$, etc. (with their possible errors $e_0$, $e_2$, $e_4$, etc.) from the supplemental or redundancy signals there-between; in this case, the signals at the odd time-unit intervals. This is effected by an alternating or switching gate 6, operating at the frequency of the reference clock, alternately to feed successive signals along paths 8 and 10 for even and odd time-unit intervals, respectively.

The even-time information symbol signals are preferably fed into a substantial replica of the original chain of shift-register encoding circuit 3–5–7–9–11–19–21, represented by the same symbols with prime notations $3'$–$5'$–$7'$–$9'$–$11'$–$19'$–$21'$. Conductors $g_1''$ through $g_{11}''$ correspond to conductors $g_1'$–$g_{11}'$ of the encoder 2, with conductors $g_3''$ and $g_5''$ considered as disconnected or open-circuited for the illustrated example.

In the absence of any error E, the output of the single delay stage $21'$ will clearly be equal to the supplemental or redundancy signals at the odd time-unit intervals, referred to as simulated redundancy signals. This output is fed along conductor 12 to an adder 14 into which the odd time-unit interval redundancy signals from the message are directly fed by conductor 10. Thus, the output of adder 14 at 16 is always zero if no error components in the transmitted redundancy and information symbol signals have occurred. This output at 16 may be represented by the product of the error components at the even time-unit intervals and the generator or code sequence (Equation (2)) plus the entire noise sequence at the odd time-unit intervals, since any output at 16 can only be caused by the noise signals. The error signal components S of the output may be shown to comprise the following groups at the odd-unit instants of time:

$S_1 = g_1 e_0 + e_1$
$S_3 = g_3 e_0 + g_1 e_2 + e_3$
$S_5 = g_5 e_0 + g_3 e_2 + g_1 e_4 + e_5$
$S_7 = g_7 e_0 + g_5 e_2 + g_3 e_4 + g_1 e_6 + e_7$
$S_9 = g_9 e_0 + g_7 e_2 + g_5 e_4 + g_3 e_6 + g_1 e_8 + e_9$
$S_{11} = g_{11} e_0 + g_9 e_2 + g_7 e_4 + g_5 e_6 + g_3 e_8 + g_1 e_{10} + e_{11}$, etc. (6)

For the previous example, $g_1 = 1$, $g_3 = g_5 = 0$, and $g_7 = g_9 = g_{11} = 1$, this reduces to $S_1 = e_0 + e_1$
$S_3 = e_2 + e_3$
$S_5 = e_4 + e_5$
$S_7 = e_0 + e_6 + e_7$
$S_9 = e_0 + e_2 + e_8 + e_9$
$S_{11} = e_0 + e_2 + e_4 + e_{10} + e_{11}$ (7)

This sequence may be called a sequence of parity checks, as later explained. The following four equations may now be evolved:

$S_1 = e_0 + e_1$
$S_3 + S_9 = e_0 + e_3 + e_8 + e_9$
$S_7 = e_0 + e_6 + e_7$
$S_{11} = e_0 + e_2 + e_4 + e_{10} + e_{11}$ (8)

These four equations have the property that $e_0$ enters into each equation, and no other error component enters into more than one equation. It follows that one can correctly determine $e_0$ provided there are at most two errors in the eleven symbols in this set of equations, by using the rule: $e_0 = 1$, if three or more of the equations, by using the above, have a value of one; and $e_0 = 0$, otherwise. Such a set of equations is termed a set of parity checks (or, more generally, subsolutions) orthogonal on $e_0$.

In general, a set of a number $j$ of parity checks, orthogonal on $e_0$, suffices to determine $e_0$ correctly provided that $j/2$ or fewer errors ocurr. If the above system enables the detection of N errors, then correction for $j$–$N/2$ errors can be attained, as hereinafter explained. In such case, the appropriate rule will be: $e_0 = 1$, if $$\left(\frac{j+N}{2}\right)$$

or more of the $j$ equations have a value of one; $e_0 = 0$, if $j$–$N/2$ or fewer equations have a value of unity; and otherwise, a detected but uncorrectable error has occurred.

In the system of FIG. 1, with the illustrated example, circuitry is provided for sensing whether three or more of the equations of set (8) have a value of one. This is done by applying the output at 16 to a further shift-register bank comprising 2-unit delay circuits $3''$, $5''$, $7''$, $9''$ and $11''$, with adder circuits, for a reset purpose later explained, interposed at 20, 22, and 24, in the input of respective stages 3″, 5″ and 7″.

At time of the eleventh-unit time interval the error signal $S_1$ has arrived at the output 26 of the stage 11″; error signal $S_3$ is at the output conductor 28 from stage 9″; error signal $S_7$ is at output conductor 30 from stage 5″; error signal $S_9$ is at output conductor 32 from stage 3″; and error signal $S_{11}$ is at output conductor 34 at the output 16 of the adder 14. These signals $S_1$, $S_3$, $S_7$, $S_9$ and $S_{11}$ correspond to all the errors in the set of Equations 8. The signal $S_1$ (represented by the first equation of set (8)) is applied by conductor 26 to a threshold-signal-operated circuit 36, later discussed. The signal $S_3+S_9$ (represented by the second equation of set (8)) is produced by connecting conductors 32 and 28 to a further adder 38 and applying the output thereof at 39 to the circuit 36. Signals $S_7$ and $S_{11}$ (the third and fourth equations, respectively of set (8)) are respectively applied to the circuit 36 by conductors 30 and 34. The threshold voltage of operation of circuit 36 is adjusted to produce a "1" output at 40 when three or more of the above inputs thereto are "1." The output 40, referred to as a solution signal, will thus provide the decoded estimate of the value of the error signal $e_0$ by the rule above-described, being fed to another adder 27 at this eleventh-unit interval of time.

By connecting a further single-unit delay device 23 in the output of the stage 11′, there will be produced at 25, the first received information symbol signal $i_{0_r}$ at the same eleventh unit of time just discussed. This symbol signal is also applied to the adder 27, resulting in the addition of the information signal $i_{0_r}$ (equal to $i_0+e_0$) to the determined value of $e_0$. This addition "adds out" $e_0$, changing the information symbol signal from "1" to "0" or from "0" to "1" in the event that the error output at 40 indicates that the noise or other factors introduced an erroneous change in transmission in connection with information symbol $i_{0_r}$. Similar remarks apply to the successive information symbol signals.

If such an error has thus been detected and corrected, it is necessary to reset the adders 20, 22, 24 to add-out the $e_0$ components that remain as terms in the stored parity check signals $S_9$, $S_7$ and $S_{11}$ so that they are ready to indicate further errors. This is effected by feeding back the signal $e_0$ from the output 40, along conductor 40′, to each of the adders 20, 22, 24, thus to restore the same to the condition prior to the detection of the previous error; i.e., to remove the signal $e_0$ and permit the circuit to operate with the next information symbol signal $i_{2_r}$ as if this were the first signal, $i_{0_r}$, all over again.

Since not all the equations of set (8) have the same number of error-signal components or terms, the longer equations more probably provide an erroneous indication than the shorter equations with less terms. Weighting of the outputs representing these equations may therefore be provided, as by potentiometers or voltage dividers or the like 26′, 30′, 39′ and 34′, FIG. 2, to render all equations substantially equally likely to cause output errors.

For the illustrated example, a suitable weighting sequence of adjustment for this result is as follows:

| Output conductor: | Weighting adjustment, potentiometer |
| --- | --- |
| 26 | 26′–1.00 |
| 30 | 30′–0.75 |
| 39 | 39′–0.60 |
| 34 | 34′–0.50 |

This weighting sequence is for a condition where the noise or other information symbol-changing factor has a probability of $1/16$ for changing each message signal, and the threshold of the circuit 36 has been set for a relative voltage, compared to the above-adjustments, of 1.92.

Figure 3:
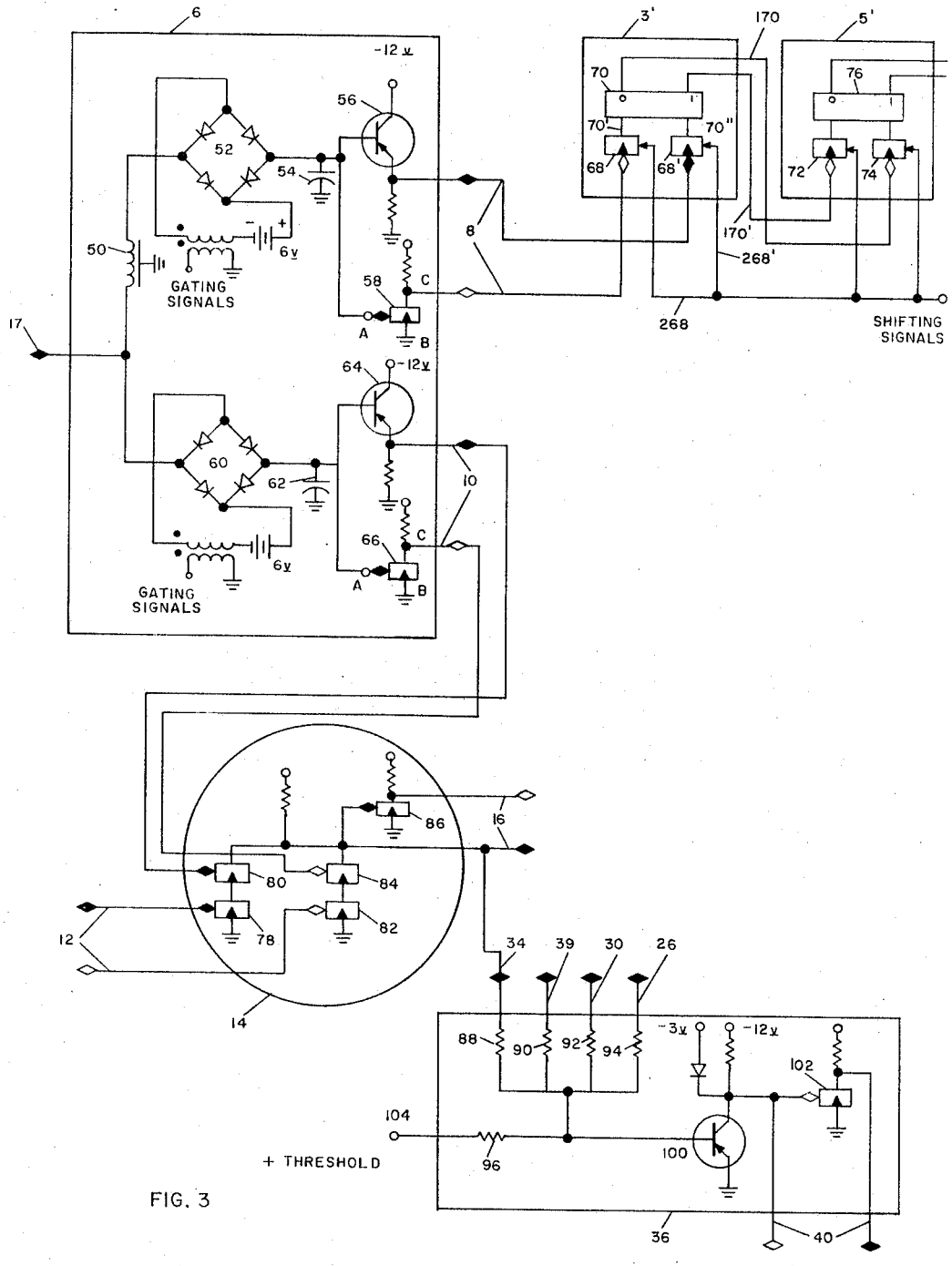
FIG. 3 is a circuit diagram of preferred electrical and electronic circuits for realizing the operation of the system of FIG. 1.

While the conventional types of circuit elements employable in the system of FIG. 1 are immediately evident to those skilled in the art, preferred circuit details of time-delay or shift-register units 3, 3′, 3″ etc., gate or adder circuits 14, 15, 19, 19′, etc., the switching gate 6, and the threshold-voltage-operated circuit 36 are shown in FIG. 3, with illustrative reference to the decoder circuit 4, though the same type of circuits are equally applicable in the encoder 2, as before explained. In the example of FIG. 3, the solid diamond symbol indicates "0" and "1" states for ground and −3 volts, respectively; while the unshaded diamond symbol indicates a "0" state of −3 volts and a "1" state of ground potential, respectively; where the term "ground" means not only actual earthing, but chassis or other reference potential, as well.

The switching gate 6 of FIG. 1 may assume the form illustrated in FIG. 3 wherein the received signals are applied by conductor 17 to a pair of rectifier bridge gates 52 and 60, the former of which is connected to the conductor 17 through a delay line 50 that delays the signals one reference-clock time unit. Gating signals, so labeled in the graph or timing diagram of FIG. 3B, control the opening and closing of gates 52 and 60 of the switching gate circuit 6, being applied to the transformers labeled "gating signals" in FIG. 3. When the first positive pulse gating signal occurs, the first received signal, FIG. 3A, has been applied to gate 52 and the second received signal will be applied to gate 60, these signals being stored in respective capacitors 54 and 62 during such first positive-pulse gating signal. An emitter follower stage and an inverter stage are each connected to the respective capacitors 54 and 62; the emitter follower stage 56, and the inverter 58, being connected to capacitor 54, and the emitter follower stage 64 and the inverter stage 66 being connected with capacitor 62. The inverters 58 and 66 may be of any conventional type, such as the transistor stage of FIG. 3D, wherein the letters A, B and C correspond to those associated with the conductors connected to the inverters 58 and 66 of FIG. 3, and with typical operating voltages indicated in FIG. 3D. The emitter follower stage 56 and inverter 58 thus will have in their output circuits the first received signal and its logical complement, respectively, from the time of occurrence of the first positive gating signal, FIG. 3B, until the next positive pulse gating signal. These outputs result on conductors 8, corresponding to conductor 8 of FIG. 1.

Similarly, during the same time interval, the second received signal and its logical complement will be produced in the respective outputs of the emitter follower stage 64 and the inverter 66, along output conductors 10, corresponding to conductor 10 of FIG. 1. In this particular circuit, the single time interval delay effected by the circuit 21′ of FIG. 1, however, is provided automatically by the switching gate circuit 6 since this gate has the effect of retarding the received signal input to gate 52 by one clock unit relative to the received signal input to gate 60, as before explained. This effectively puts all the signal outputs from switching gate 6 into the necessary time synchronization.

The shift-register or delay circuits 3′, 5′, etc. of FIG. 1 are each realized in the embodiment of FIG. 3, by single flip-flops 70, 76, etc., having internal delays, as shown in the illustrative conventional transistor circuit of FIG. 5 in connection with the flip-flop 70. The lead connections to the flip-flop 70 in FIG. 3 are given the same reference numerals as the corresponding lead connections of FIG. 5. Delay lines 150 and 152 of FIG. 4, in the output circuits of the two transistors, introduce a delay much shorter than one reference-clock time unit, but greater than the duration of the shifting pulses shown in the timing diagram of FIG. 3C. When a shifting-signal negative pulse occurs, the output on conductor 8 is stored in flip-flop 70 via the inverters 68 and 68′ and respective lead conductors 70′ and 70″, with the shifting signals applied to inverters 68 and 68′ by conductors 268 and 268′, respectively. The previous signal contents of flip-flop 70 are transferred at the same instant to flip-flop 76 of the next stage 5′ via inverters 72 and 74 (also supplied with shifting signals) by output conductors 170' and 170, respectively. This internal delay of flip-flop 70 prevents any interference between these two switching operations since the new internal state of flip-flop 70 is not available at its output terminals until after the shifting signal negative pulse, FIG. 3C, has passed.

The "modulo-two" adder 14 of the block diagram of FIG. 1 is realized in the circuit of FIG. 3 by the four inverters 80, 82, 84, and 78, as of the type shown in previously discussed FIG. 3D, or of any other suitable well-known type. With this arrangement, the output on conductor 16 (corresponding to conductor 16 of FIG. 1) is a "one" when, and only when, the input signals on lines 10 and 12 are different. A further inverter 86 is provided so that signal fed along both conductors 16 contains both the "modulo-two" sum of the input signals and the logical complement of this sum.

The threshold operation of the device 36 of FIG. 1 is realized in the illustrative circuit of FIG. 3 by feeding the signals on conductors 34, 39, 30 and 26 (corresponding to the similarly numbered conductors in FIG. 1) to resistors 88, 90, 92, and 94, respectively, all connected to the base of transistor 100. A positive voltage equal to the predetermined desired "threshold" is applied on conductor 104. The weighting that is to be applied to each orthogonal parity check is obtained by appropriate choices of the values of resistors 88, 90, 92 and 94 relative to resistor 96, these fixed predetermined resistors corresponding to the potentiometers 34', 39', 30' and 26', respectively, of the embodiment of FIG. 2. Typical operating voltages for the transistor 100 are indicated.

When the weighted sum of the inputs on conductors 34, 39, 30 and 26 exceeds the predetermined threshold voltage on conductor 104, transistor 100 conducts and causes a "one" output to appear at conductors 40, corresponding to conductor 40 of FIG. 1. Inverter 102 is provided so that the conductors 40 contain both the appropriate output and its logical complement.

Alternatively to repeating the encoding shift-register operation at 3', 5', 7', etc., in the embodiments of FIGS. 1 and 3, use may be made of a modified decoder in which orthogonal subsolution signals are directly formed, each taking the value of the information component $i_0$ in the absence of error in the constituent message signals. A more general expression for each of the equations of set (8) may be the following, illustrated in connection with the $S_1$ equation:

$$S_1 = e_0 + e_1 = (i_0 + e_0) + (\text{transmitted signal at time unit one} + e_1)$$

$$= i_{0_r} + (\text{received signal at time unit one}) \quad (9)$$

If $i_0$ is the transmitted signal at time unit one and if $i_{0_r}$ is subtracted from $S_1$, the following expression obtains:

$$(S_1 - i_{0_r}) = -i_0 + e_1 \quad (10)$$

The subtraction modulo 2 of $i_{0_r}$ is the same as its addition modulo 2, so for the binary case equation 10 can also be written $S_1 + i_{0_r} = i_0 + e_1$ or $S_1 - i_{0_r} = i_0 + e_1$. By the same reasoning, the rest of the set of Equations (8) reduces to:

$$(S_3 + S_9 - i_{0_r}) = -i_0 + e_3 + e_8 + e_9$$
$$(S_7 - i_{0_r}) = -i_0 + e_6 + e_7$$
$$(S_{11} - i_{0_r}) = -i_0 + e_2 + e_4 + e_{10} + e_{11} \quad (11)$$

Lastly, $$i_{0_r} = i_0 + e_0 \quad (12)$$

The quantities on the left side of this set of equations thus represent a set of subsolution signals orthogonal upon $i_0$ because $i_0$ occurs on the right side of every equation. It will be noted that each of the five Equations 10, 11 and 12 can be obtained by adding the received signals corresponding to the respective error signals appearing in the equations. For example, $(S_1 - i_{0_r})$ equals the received bit $p_{1_r}$ at time one.

Since the $S - i_0$ subsolutions are always equal to $i_0$ in the absence of errors, these constitute votes as to what the true value of $i_0$ is, and the votes are "taken" by a threshold device in the manner that one can be different from the others and still the solution signal will be correct.

Figure 4:
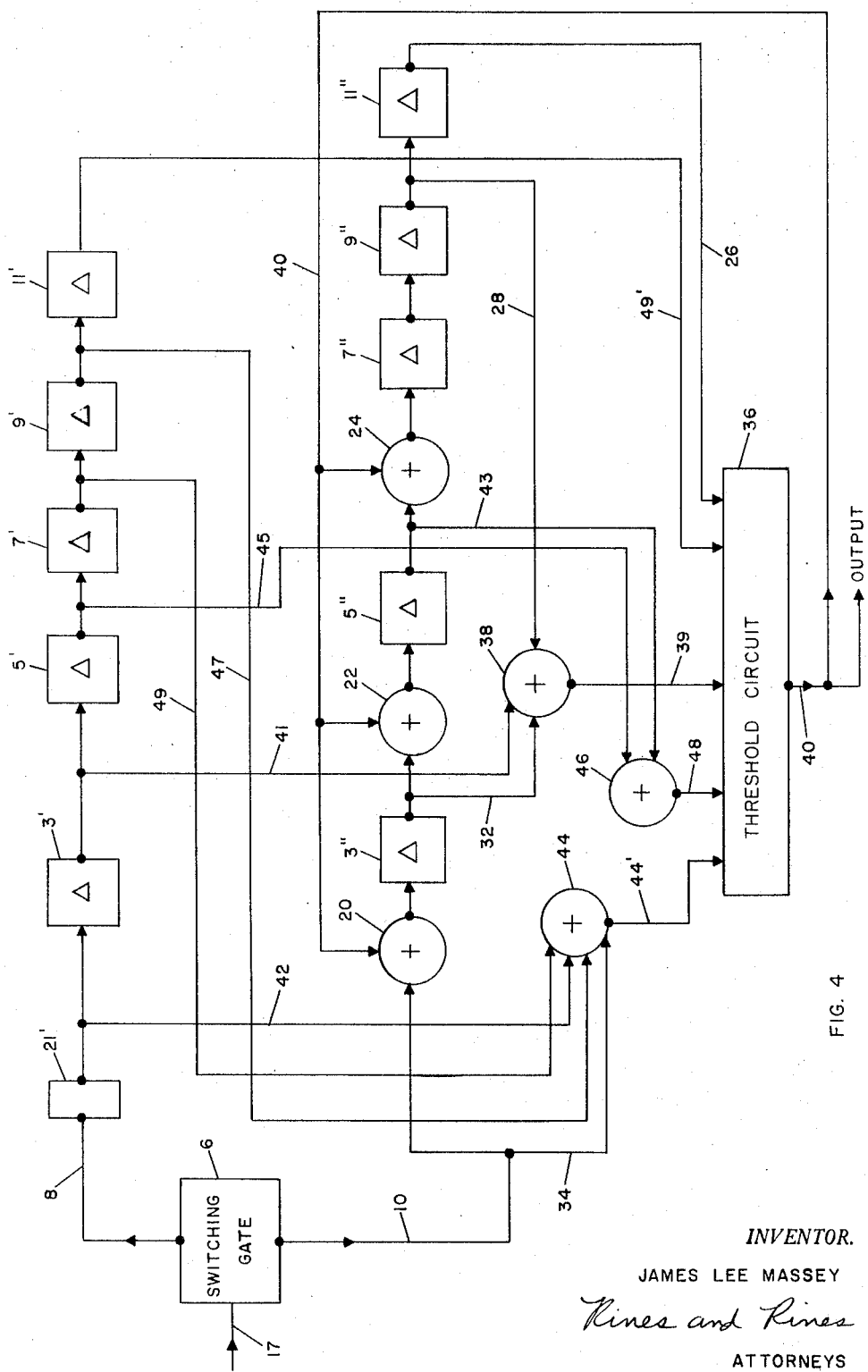
FIG. 4 is a view similar to FIG. 1 of a modified system.

This is accomplished by forming the five Equations 10, 11 and 12 in the circuit of FIG. 4, wherein circuit components similar to those of FIG. 1 have been given the same reference numerals. The estimate in the output 40 of the threshold-voltage device 36 is now the decoded estimate of $i_{0_r}$. Equation 10 is fed in by conductor 26 from the last delay stage 11″. The $(S_3 + S_9 - i_{0_r})$ input of the first equation of set (11), is applied to the device 36 by feeding output 28 from the stage 9″ to the adder 38, together with the output at 32 from the stage 3″ (supplying $e_3$ and $e_9$), and with a further output 41 from the stage 3' (supplying $e_8$). The $(S_7 - i_{0_r})$ input (second equation of set (11)), is applied at 48 by adder 46, fed by conductor 43 from stage 5″ (supplying $e_7$), and by conductor 45 from stage 5' (supplying $e_6$). The $(S_{11} - i_{0_r})$ equation is supplied at 44' by adder 44, fed by conductor 47 from stage 9' (supplying $e_2$), by conductor 49 from stage 7' (supplying $e_4$), by conductor 42 from a single time-unit delay circuit 21' (supplying $e_{10}$) and by conductor 34 from the line 10 (supplying $e_{11}$). Equation (12) is supplied by conductor 49' from the last delay circuit 11'.

The threshold circuit 36 in this case, is set for 2.50 so that there can be no ambiguity; the device producing a "1" output at 40 when three or more inputs are "1."

Figure 6:
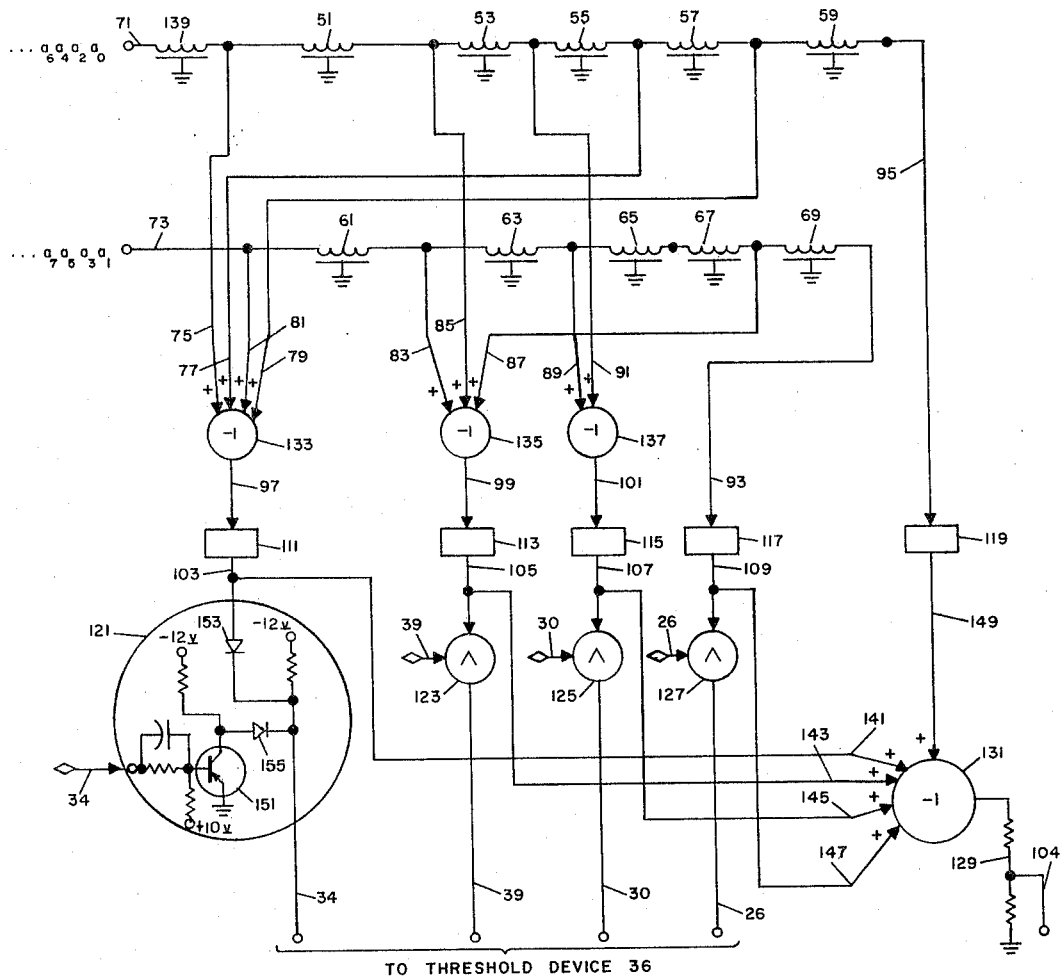
FIG. 6 is a circuit diagram of a weighting circuit for connection with systems of FIGS. 1 and 3 and in which weighting of the decoded groups is varied in accordance with changing noise and other communication-system conditions.

Again, the weighting factor concept can be employed in the system of FIG. 4 with the same weighting previously described. The input corresponding to the last Equation 12, as fed along conductor 49', will also have unity weighting in this instance, and the threshold voltage of the device 36 for such weighted operation, will be the same as before described.

Where weighting must be varied with changing noise conditions or the like, the system of FIG. 6 may be employed in all of the systems of FIGS. 1, 3 and 4. For purposes of illustration, the decoding circuit of FIGS. 1 and 3 is modified to permit variable weighting of the inputs to the threshold device 36 by the addition of the circuit shown in FIG. 6 to conductors 34, 39, 30, 26 and 104 of FIG. 3. The inputs to conductors 71 and 73 of FIG. 6 are analog voltages which contain probability information about the received signals. For example, if $p_i$ is the probability that the received bit at time $i$ is in error, then the associated quantity $a_i$ of FIG. 6 has the value $$\log_e \left( \frac{1}{1 - 2p_i} \right)$$

Even time analog voltages $a_0, a_2, a_4, a_6$, etc., are applied to conductor 71, and odd-time voltages $a_1, a_3, a_5, a_7$, etc., to conductor 73. The values of the $p_i$ are dependent on the received signal and the medium through which these signals were transmitted and may differ from one communication system to another.

A pair of series of delay devices is employed in the circuit of FIG. 6, respectively connected to conductors 71 and 73. The first series comprises delay line 139, which has a delay of one reference-clock time unit, and successive delay lines 51, 53, 55, 57 and 59, each having delays of two clock units. The second series of delay lines or similar delay devices comprises lines 61, 63, 65, 67 and 69, each having delays of two clock time units.

Conductors 75, 77, 79, and 81 apply to an analog adder 133, the analog voltages corresponding to the four received signals exclusive of the first received signal, whose noise signals appear in the fourth orthogonal parity check equation of the set of Equations 8, above; namely, a one-time-unit delayed input from the output terminal of delay line 139 by conductor 75, the output of time-delay line 55 by conductor 77, a direct feed by conductor 81 from conductor 73, and the output of delay line 57 by conductor 79. The analog adder 133, and similar later-mentioned adders 135, 137 and 131 may be of a type such as described by Korn and Korn, in "Electronic Analog Computers," McGraw-Hill, New York, 1956, p. 13, FIG. 1.5(f). The adder 133 will compute the negative sum of these analog voltages, which sum is then fed along conductor 97 to a non-linear device 111, as, for example, of the type later described in connection with FIG. 7. The device 111, like the similar later-mentioned devices 113, 115, 117 and 119, has a negative output voltage whose magnitude is proportional to $$2 \log_e \left( \frac{e^x + 1}{e^x - 1} \right)$$

when its input is X volts negative. The output of non-linear device 111 is fed along conductor 103 to analog "and" gate 121. This "and" gate is the same as later-described gates 123, 125, and 127, and its input or left-hand conductor 34 corresponds to conductor 34 of adder 14 of FIGS. 1 and 3. If the adder 14 has an output of "one," transistor 151 of FIG. 6, to the base of which the adder output is fed by conductor 34, is non-conducting. Then, providing only that the output on conductor 103 of the non-linear device 111 is smaller in magnitude than the indicated 12-volt collector voltage of transistor 151, for example, diode 153, in the path of conductor 103, will conduct and the output voltage of the non-linear device 111 will appear directly on the continued lower output conductor 34, connected through the further diode 155 to the collector of transistor 151. This voltage at 34 is therefore proportional to the weighted value of the corresponding orthogonal parity check and is applied to the threshold device 36 of FIGS. 1 and 3.

Conversely, if the output of adder 14 of FIG. 1 is a "zero," transistor 151 of FIG. 6 will be conducting. This causes diode 155 to conduct and zero output voltage to appear on the output lower conductor 34, regardless of the input voltage on conductor 103 from the non-linear device 111. Conductor 34 thus always contains the correct weighted sum of the corresponding orthogonal parity check for input to the threshold device 36 of FIGS. 1 and 3.

Adder 15 of FIG. 1, while a modulo 2 adder for theoretical purposes, must be implemented as a chopping circuit when voltage levels rather than voltage pulses are used to represent binary numbers as in the embodiment shown. Referring to FIG. 1, this can be accomplished by a circuit in which the signal on conductor 13 and the signal from delay unit 21 are applied to a pair of rectifier bridge gates. These gates are switched open and closed at unit time intervals by the chopping signals. The outputs of these gates are then applied to an emitter follower whose output correspond to the signal on conductor 17 of FIG. 1.

Since the weighting in FIG. 6 is accomplished external to the threshold device 36, resistors 88, 90, 92, 94 and 96 of FIG. 3 all will have substantially equal values.

In similar manner, the delayed outputs of delay lines 61, 51 and 67 are fed by respective conductors 83, 85 and 87 to the adder 135, the output 99 of which is applied through non-linear device 113 and by way of conductor 105 to the "and" gate 123 associated with conductor 39. "And" gates 125 and 127, respectively connected with conductors, 30 and 26, are similarly fed by conductors 107 and 109 from the respective non-linear devices 115 and 117. The inputs to non-linear devices 115 and 117 are provided by respective conductors 101 and 93 from the adder 137 and from the output of delay line 69, respectively. Into the adder 137 is fed the output of delay line 63, by conductor 89, and the output of delay line 53, by conductor 91, to complete the sums of the set of equations (8) before described.

The threshold input for conductor 104 in FIG. 3 is computed in FIG. 6 by feeding the outputs of the non-linear devices 111, 113, 115, 117, and 119 along respective conductors 141, 143, 145, 147 and 149 to a further analog adder 131 which forms the negative sum of these voltages. The non-linear device 119 is fed by conductor 95 from the output of delay line 59. Voltage divider 129, connected to the output of adder 131, thus has, as its output, a part, say one-half, of the output of adder 131, which is the correct voltage for the input to the threshold device 36 of FIGS. 1 and 3.

Figure 7:
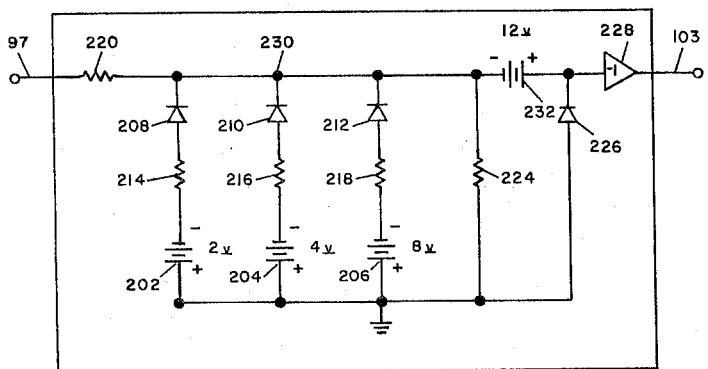
FIG. 7 is a preferred non-linear circuit for use in the system of FIG. 6.

A preferred circuit for the non-linear device 111 (and non-linear devices 113, 115, 117 and 119) is shown in FIG. 7. The negative output voltage on input conductor 97 of FIG. 6 is shown in FIG. 7 as the input to resistor 220. A shunt resistor 224 is connected from resistor 220 to ground, and in parallel with the shunt resistor 224 is a plurality of networks each comprising a diode, a resistor and a source of bias potential; to wit, diode 208, resistor 214 and source 202 (2 volts, say); diode 210, resistor 216 and larger source 204 (4 volts, say); and diode 212, resistor 218 and still larger source 206 (say, 8 volts).

When the negative voltage at 97 causes the voltage at terminal 230 to be more negative than, say, minus 2 volts, the first diode 208 conducts and causes resistor 214 to be placed in shunt with resistor 224. The three diodes 208, 210, and 212 thus cause the voltage at terminal 230 to be the voltage output of a non-linear voltage divider with respect to the input voltage on conductor 97.

A further still larger potential source, shown as battery 232, is connected in series with the voltage at terminal 230, to apply an input to an analog inverter 228 of any well-known type, such as, for example, the type described in Korn and Korn, "Electronic Analog Computers," McGraw-Hill, New York, 1956, p. 13, FIG. 1.5(b).

A diode 226, connected between the input of inverter 228 and ground, prevents the input to inverter 228 from going below ground voltage. By adjustment of the resistors 214, 216, 218, 220, and 204, the output of the inverter 228 can be made to be a close approximation to a negative voltage proportional to $$2 \log_e \left( \frac{e^x + 1}{e^x - 1} \right)$$

for an input voltage on conductor 97 of X volts negative, which was the requirement, before explained, for the non-linear device 111. In this equation, $e$ is the Napierian base.

Further modifications will occur to those skilled in the art and all such are considered to fall within the spirit and scope of the invention as defined in the appended claims.

What is claimed is:

1. An apparatus for decoding an information signal from an encoded digital binary message, the message having been exposed to error conditions so that each signal in the message comprises in effect the modulo 2 sum of a message component, and an error component that is "0" when no error occurs and "1" when an error occurs, the message having been encoded by a binary convolutional code so that the message comprises information signals and related redundancy signals, the message component of each information signal comprising an information component, the message component of each redundancy signal comprising a redundancy component formed as the modulo 2 sum of selected information components, each information component being a term in a multiplicity of such redundancy components, the apparatus comprising a modulo 2 adder subsolution means for forming by modulo 2 addition, a set of orthogonal subsolution signals for the information signal to be decoded, said set of orthogonal subsolution signals comprising more than two distinct binary signals in which each signal has as a term the same one of the components of said information signal being decoded, whereby each subsolution signal can indicate a solution for the value of said component, no more than one signal of said set having as a term the other component of said information signal being decoded, no more than one signal of said set having as a term the error component of any other message signal, and none of the signals of said set having as a term the message component of any other message signal; a threshold device, means to apply to said threshold device a multiplicity of threshold inputs each controlled by the value of one of said more than two subsolution signals, said threshold device comprising means to sum by ordinary addition said threshold inputs and to compare said sum of threshold inputs to a threshold value and means to generate a threshold output signal indicating the relationship of said sum of threshold inputs to said threshold value, said threshold value sized to be exceeded for at least one case when one of said more than two subsolution signals is different from the others.

2. The apparatus of claim 1 wherein the inputs to said subsolution means for forming at least one of said subsolution signals includes at least two redundancy signals.

3. The apparatus of claim 1 adapted to decode a succession of information signals wherein said threshold output signal is the decoded binary value of said component of the information signal being decoded, including means for feeding back said threshold output signal as an input to said subsolution means to cause said threshold output signal to be an added modulo 2 term in the subsolution signals for successive information signals.

4. The apparatus of claim 1 in which each of said threshold inputs has the same two possible binary values and said threshold value is equal substantially to the least integer larger than one half the total number of those threshold inputs that are controlled by subsolution signals containing redundancy signals as terms.

5. The apparatus of claim 1 adapted to produce a corrected information signal wherein the inputs to said subsolution means correspond to the terms of parity checks and the subsolution outputs of said subsolution means comprise a set of parity check signals orthogonal upon the error component of the information signal being decoded, the means to apply said threshold inputs to said threshold device adapted to apply for each subsolution signal a threshold input of zero when said subsolution signal is "0" and a threshold input of positive value wehn said subsolution signal is "1," said threshold device adapted to generate said threshold output signal as a binary signal "1" when the threshold value is exceeded and "0" when it is not, a modulo 2 corrector means having as one corrector input the information signal being decoded, and as a second corrector input the threshold output signal, the output of said corrector means comprising the modulo 2 addition of said corrector inputs.

6. The apparatus of claim 1 having a first storage means for a succession of information signals from the message, the subsolution means for forming said set of subsolution signals includes a modulo 2 adder means, means for applying sequentially to said adder means a series of redundancy signals and, together with each, information signals from said first storage means that have the same information components as the respective redundancy signal, a second storage means for storing the succession of outputs from said modulo 2 adder, and means connected to selected stages of said second storage means for providing said subsolution signals.

7. The apparatus of claim 6 wherein said modulo 2 adder means includes a modulo 2 adder for adding said information signals that have said same information components to form a simulated redundancy signal, said first storage means and said adder being a replica of an encoder, and a further modulo 2 adder for adding the simulated redundancy signal to the corresponding redundancy signal.

8. The apparatus of claim 1 adapted to produce a corrected information signal wherein the inputs to said subsolution means correspond to the terms of parity checks minus the information signal being decoded and the outputs of said subsolution means comprise a set of subsolution signals orthogonal upon the information component of the information signal being decoded, said means to apply said threshold inputs to said threshold device adapted to apply for each subsolution signal an input of zero when said subsolution signal is "0" and an input of positive value when said subsolution signal is "1" and said threshold device is adapted to generate said threshold output signal as a binary signal "1" when the threshold value is exceeded and "0" when it is not.

9. The apparatus of claim 8 adapted to correct a succession of information signals including first and second storage means for storing respectively successions of information and redundancy signals from the message, the inputs to said subsolution means comprising connections to selected stages of said first and second storage means, means for feeding back the threshold output signal from said threshold device to said subsolution means comprising a plurality of feedback adders disposed between stages of said second storage means preceding the last stage to which a connection is made for an input to said subsolution means, each feedback adder having as one input the threshold output signal and as a second input a redundancy signal that contains the information component of the signal being decoded, said feedback adders adapted to add the threshold output signal modulo 2 to said redundancy signals to add-out said information component term from said redundancy signals to enable the correction of subsequent information signals.

10. An apparatus for correcting a succession of information signals from an encoded digital binary message, the message having been exposed to error conditions so that each signal in the message comprises in effect the modulo 2 sum of a message component, and an error component that is "0" when no error occurs and "1" when an error occurs, the message having been encoded by a binary systematic convolutional code so that the message comprises information signals and related redundancy signals, the message component of each information signal comprising an information component, the message component of each redundancy signal comprising a redundancy component formed as a modulo 2 sum of selected information components, each information component being a term in a multiplicity of such redundancy components, and the information signals whose information components are terms in a given redundancy signal reach the decoder before said redundancy signal, the apparatus comprising a first storage means for progressively storing a series of said information signals, first modulo 2 adder means connected to add modulo 2 each redundancy signal reaching the decoder with stored information signals that have the same information component terms as the redundancy signal so that the information components add-out, each of the resultant signals being a parity check signal which equals the sum of the error components of the corresponding signals of the message, a second storage means for progressively storing said parity check signals, means connected to selected stages of said second storage means for producing from selected parity check signals a set of more than two subsolution signals, each subsolution signal incorporating as a term the error component of the information signal being decoded, and no more than one of said subsolution signals incorporating as a term the error component of any other message signal, a threshold device, means to apply to said threshold device a multiplicity of distinct threshold inputs each controlled by the value of one of said subsolution signals, said threshold device comprising means to sum by ordinary addition said threshold inputs and to compare said sum of threshold inputs to a threshold value and means to generate a binary threshold output signal indicating the relationship of said sum of threshold inputs to said threshold value, said threshold value sized to be exceeded for at least one case when one of said subsolution signals is different from the others, corrector means connected to said threshold output adapted to produce the corrected value for the information component of the information signal being decoded, and a plurality of feedback adders positioned between stages of said second storage means preceding the last stage to which there is a connection for forming a subsolution signal, each feedback adder having as one input a parity check signal that contains the error component of the information signal being decoded and as a second input a binary signal of the value of the error component of the information signal being decoded, said feedback adders adapted to add-out modulo 2 said error component to prepare said apparatus for correcting successive information signals.

11. An apparatus for correcting a succession of information signals from an encoded digital binary message, the message having been exposed to error conditions so that each signal in the message comprises in effect the modulo 2 sum of a message component, and an error component that is "0" when no error occurs and "1" when an error occurs, the message having been encoded by a binary, systematic convolutional code so that the message comprises information signals and related redundancy signals, the message component of each information signal comprising an information component and the message component of each redundancy signal comprising a redundancy component formed as the modulo 2 sum of selected information components, each information component being a term in a multiplicity of such redundancy components, the apparatus comprising a first storage means for progressively storing a series of said information signals and a second storage means for progressively storing a corresponding series of redundancy signals, a first modulo 2 adder means connected to selected stages of said first and second storage means for adding modulo 2 selected redundancy and information signals to form a set of subsolution signals, each subsolution signal incorporating as a term a redundancy signal that contains the information component of said information signal to be decoded and as further terms the information components corresponding to the terms of said redundancy signal excepting in each case the information component of the information signal being decoded so that all other information components add out, no more than one of said subsolution signals incorporating as a term the error component of any one message signal, a threshold device, means to apply to said threshold device a multiplicity of distinct threshold inputs each controlled by the value of one of said subsolution signals, said threshold device comprising means to sum by ordinary addition said threshold inputs and to compare said sum of threshold inputs to a threshold value and means to generate a binary threshold output signal indicating the relationship of said sum of threshold inputs to said threshold value, said threshold value sized to be exceeded for at least one case when one of said subsolution signals is different from the others, said threshold output signal being the corrected value of the information component of the information signal being decoded, and a number of feedback adders positioned between stages of said second storage means preceding the last stage to which there is a connection for forming said subsolution signals, each of said feedback adders having as one input a redundancy signal that incorporates the information component of the information signal being decoded as a term and as a second input a binary signal of the value of said information component, said feedback adders adapted to add-out modulo 2 said information component to prepare said apparatus for correcting successive information signals.

12. The apparatus of claim 11 wherein the information signal being decoded is stored in a stage of said first storage means, and a connection is made to said stage to cause said information signal to control a threshold input.

13. Decoding apparatus for providing a probabilistic decoding solution for an information signal from an encoded digital binary message, the message having been exposed to error conditions so that each signal in the message comprises in effect the modulo 2 sum of a message component, and an error component that is "0" when no error occurs and "1" when an error occurs, the message having been encoded by a binary systematic code so that the message comprises information signals and related redundancy signals, the message component of each information signal comprising an information component, the message component of each redundancy signal comprising a redundancy component formed as a modulo 2 sum of selected information components, each information component being a term in a multiplicity of such redundancy components, the apparatus comprising a modulo 2 adder subsolution means for forming by modulo 2 addition at least two orthogonal subsolution signals for the information signal to be decoded, said orthogonal subsolution signals comprising distinct binary signals in which each signal has as a term the same one of the components of said information signal being decoded whereby each signal can indicate a solution for the value of said component, no more than one of said signals having as a term the other component of said information signal being decoded, no more than one of said signals having as a term the error component of any other message signal, and none of said signals having as a term the message component of any other message signal; the probability that one of said subsolution signals provides an erroneous decoding solution being greater than the probability for another one of said subsolution signals, a threshold device, means to apply to said threshold device a plurality of threshold inputs each controlled by the value of one of said subsolution signals, weighting means adapted to cause the threshold input controlled by the subsolution signal having the higher probability of an erroneous decoding solution to be of smaller value than the threshold input controlled by the subsolution signal having the lower probability of an erroneous decoding solution, said threshold device comprising means to sum by ordinary addition said threshold inputs and to compare said sum of threshold inputs to a threshold value and means to generate a threshold output signal indicating the relationship of said sum of threshold inputs to said threshold value, said threshold value sized to be exceeded for at least one case when one of said subsolution signals is different from another.

14. The apparatus of claim 13 wherein the numbers of error component terms of at least two of said subsolution signals are different and said weighting means is adapted to cause the threshold input controlled by the subsolution signal having the larger number of error-component terms to have a lower value to compensate for the greater probability that the subsolution signal having the larger number of said terms gives an erroneous decoding solution for the information signal.

15. The apparatus of claim 13 wherein the probability varies that message signals reaching the decoder are erroneous, the apparatus comprising variable weighting means adapted to respond to the varying probability of error in the message signal to correspondingly vary the value of each of the threshold inputs.

16. The apparatus of claim 13 wherein said weighting means for determining the value of the threshold inputs comprises means for multiplying by ordinary arithmetic each subsolution signal by a corresponding value $y$, each of said values $y$ defined by the formula:

$$y = 2 \log_e \left( \frac{e^x + 1}{e^x - 1} \right)$$

said weighting means including means to produce the values $x$ for the subsolution signals, each of said values $x$ defined by the formula:

$$x = \Sigma \log_e \left( \frac{1}{1 - 2p_i} \right)$$

in which $p_i$ is the probability that the error component is "1" in the $i$th message signal in the respective subsolution signal and the summation denoted by $\Sigma$ is the sum by ordinary arithmetic of said log values for all the message signals excluding the message signal to be decoded in the respective subsolution signals, said $e$ in each case being the Napierian base.

17. The apparatus of claim 16 wherein the subsolution means for forming said orthogonal subsolution signals is adapted to form said signals orthogonal upon the error component of the information signal being decoded, said threshold device including means to produce the threshold value equal substantially to one half the sum by ordinary arithmetic of the value $y$ of said information signal being decoded and the values $y$ of the threshold inputs, the value $y$ of said information signal being decoded defined by the formula:

$$y = 2 \log_e \left( \frac{e^x + 1}{e^x - 1} \right)$$

and means adapted to produce the value $x$ for said information signal being decoded defined by the formula $$x = \log_e \left( \frac{1}{1 - 2p} \right)$$

in which $p$ is the probability that the error component is "1" in the information signal being decoded.

18. Apparatus for detecting errors caused by noise and similar factors in successive information signals transmitted with related redundancy signals, having, in combination, means for receiving and identifying the transmitted information and redundancy signals, and entering the information signals in a set of memory devices, means for interconnecting the memory devices to produce a plurality of different groups of error signals associated with different received information signals and redundancy signals and resulting from the said noise and similar factors, threshold means connected with the last-named means to receive a set of said groups orthogonal upon an information signal and responsive to the presence of a predetermined number of such groups for producing a signal to indicate an error in said information signal, said connection to said threshold means provided with weighting means adapted to establish the weight given to a given input in the decision in reverse relation to the error probability of the components from which said input is formed.

19. Apparatus as claimed in claim 18 and in which the said weighting is adjusted so that groups containing different numbers of error signals will have substantially the same effect upon the responsive threshold means.

20. Apparatus as claimed in claim 18 in which automatic variable weighting means is provided for weighting the said groups in accordance with changes in error-signal probability distributions and in which the weighting-varying means comprises a pair of delay chains connected to receive analog voltages containing probability information relating to the successive received signals and connected with a plurality of adder circuits to provide sums of said analogue voltages representing the combined probability value for the terms of each of said error sums.

21. Apparatus as claimed in claim 20 and in which the analog voltages $a_i$ have the following relationship with the probability $p_i$ that the received signal at time $i$ is in error:

$$a_i = \log_e \left( \frac{1}{1 - 2p_i} \right)$$

22. Apparatus as claimed in claim 21 in which each adder circuit is connected to a nonlinear device, and in which the non-linear devices produce an output voltage, in response to an input voltage X, substantially given by the expression $$2 \log_e \left( \frac{e^x + 1}{e^x - 1} \right)$$

wherein $e$ is the Napierian base each non-linear device connected through an "and" gate, to said responsive means, the corresponding error sum controlling said "and" gate.

23. The apparatus of claim 1 including a memory means for registering said information signals, said modulo 2 adder subsolution means including a plurality of connections to said memory means for forming a group of initial parity check signals, each parity check signal containing one redundancy signal, a means to add together modulo 2 selected initial parity check signals to provide composite parity check signals, and output means providing said composite parity check signals together with selected members of said group of initial parity check signals to form said set of orthogonal subsolution signals.

References Cited by the Examiner

UNITED STATES PATENTS

| | | | |
|---|---|---|---|
| 3,128,449 | 4/1964 | Armstrong | 340—146.1 |
| 3,137,788 | 6/1964 | Froggatt | 235—153 |
| 3,155,819 | 11/1964 | Goetz | 235—153 |

OTHER REFERENCES

Error-Correcting Codes, by William Wesley Paterson, The M.I.T. Press and John Wiley & Sons, Inc., 1961, pp. 217–235.

ROBERT C. BAILEY, *Primary Examiner.*

I. S. KAVRUKOV, *Assistant Examiner.*

UNITED STATES PATENT OFFICE
CERTIFICATE OF CORRECTION

Patent No. 3,303,333                      February 7, 1967

James Lee Massey

It is hereby certified that error appears in the above numbered patent requiring correction and that the said Letters Patent should read as corrected below.

Column 3, line 8, before "In this" insert the following:

, where t is the entire digital message stream, I is the entire digital stream of information components and g is the generator sequence. With systematic codes, that is, codes such as the example above in which the generator sequence commences with the integer 1, each information component $i_0$, $i_2$, $i_4$, etc., appears by itself in the message stream at some unit of time as well as becoming a term in a multiplicity of redundancy components in the message. With such codes the information components $i_0$, $i_2$, $i_4$, etc., and the redundancy components $p_1$ (equaling $g_1 i_0$), $p_3$ (equaling $g_3 i_0 + g_1 i_2$), $p_5$ (equaling $g_5 i_0 + g_3 i_2 + g_1 i_4$), etc., together comprise the digital message components of the stream t, each $g_1$, $g_3$, $g_5$, etc., in in the binary case can take the value of either "1" or "0", the particular "g's" that are "1's" depending on the specific code chosen.

same column 3, line 32, for "$t=1+D^1+D^7+D^9+11$" read -- $t=1+D^1+D^7+D^9+D^{11}$ --; line 60, for "module-" read -- modulo- --; line 71, after "successive" insert -- received --; column 4, line 4, for "and" read -- and --; line 51, for "elevent" read -- eleven --; line 52, for "equations, by using the" read -- equations of set (8), --; line 59, for "j-N/2" read -- $\frac{j-N}{2}$ --; line 63, for "(j+N)" read -- $\frac{(j+N+1)}{2}$ --; same column 4, line 67, for "j-N/2" read -- $\frac{j-N}{2}$ --; column 8, line 52, for $$\log_e\left(\frac{1}{1-2p_1}\right) \quad\quad \text{read} \quad\quad \log_e\left(\frac{1}{1-2p_i}\right)$$

column 11, line 44, for "wehn" read -- when --; column 15, line 5 for $$x = \Sigma \log_e \left( \frac{1}{1-2p_i} \right) \quad \text{read} \quad x = \Sigma \log_e \left( \frac{1}{1-2p_i} \right)$$

Signed and sealed this 17th day of October 1967.

(SEAL)
Attest:

EDWARD M. FLETCHER, JR.　　　　　　　　　　EDWARD J. BRENNER
Attesting Officer　　　　　　　　　　　　　Commissioner of Patents